(12) United States Patent
Takeuchi et al.

(10) Patent No.: US 9,653,077 B2
(45) Date of Patent: May 16, 2017

(54) MESSAGE PROCESSING DEVICE

(71) Applicant: HONDA MOTOR CO., LTD., Tokyo (JP)

(72) Inventors: Johane Takeuchi, Wako (JP); Yuki Todo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 14/065,480

(22) Filed: Oct. 29, 2013

(65) Prior Publication Data

US 2014/0142938 A1 May 22, 2014

(30) Foreign Application Priority Data

Nov. 16, 2012 (JP) .................................. 2012-252240

(51) Int. Cl.
*G10L 15/26* (2006.01)
*G10L 15/22* (2006.01)

(52) U.S. Cl.
CPC .............. *G10L 15/26* (2013.01); *G10L 15/22* (2013.01)

(58) Field of Classification Search
CPC ... G10L 15/22; H04M 1/271; H04M 2201/40; H04M 2250/74; G06Q 50/01
See application file for complete search history.

(56) References Cited

U.S. PATENT DOCUMENTS

| 5,632,002 | A | * | 5/1997 | Hashimoto | ............. | G06F 3/165 |
| | | | | | | 704/231 |
| 7,409,229 | B2 | * | 8/2008 | Choi | ..................... | H04M 1/271 |
| | | | | | | 455/412.1 |
| 2003/0014260 | A1 | * | 1/2003 | Coffman | ................. | G10L 15/26 |
| | | | | | | 704/275 |
| 2008/0065974 | A1 | * | 3/2008 | Campbell | ............ | G06Q 10/107 |
| | | | | | | 715/200 |

(Continued)

FOREIGN PATENT DOCUMENTS

| JP | 2002-131061 A | 5/2002 |
| JP | 2004-288146 A | 10/2004 |

(Continued)

OTHER PUBLICATIONS

W3C—Speech Recognition Grammar Specification—Version 1.0, W3C Recommendation Mar. 16, 2004, pp. 1-86, retrieved from http://www.w3.org/TR/speech-grammar/.

(Continued)

*Primary Examiner* — Angela A Armstrong
(74) *Attorney, Agent, or Firm* — Squire Patton Boggs (US) LLP

(57) ABSTRACT

A speech input recognition unit, an event processing unit, which processes an event including a speech recognition result or a command, an expert unit including a plurality of expert modules each of which processes the event in cooperation with the event processing unit, and an execution history management unit, which manages execution history of the expert modules are provided. The expert unit is, for (Continued)

recording a user speech as message text, provided with a speech processing expert module for producing standard format text and a speech processing expert module for producing free format text and a transmission expert module for sending the message text.

11 Claims, 13 Drawing Sheets

(56) References Cited

U.S. PATENT DOCUMENTS

| | | | | |
|---|---|---|---|---|
| 2008/0133230 A1* | 6/2008 | Herforth | ............... | G01C 21/26 704/235 |
| 2009/0024707 A1* | 1/2009 | Aase | ..................... | G10L 15/26 709/206 |
| 2009/0070109 A1* | 3/2009 | Didcock | ............... | G10L 15/30 704/235 |
| 2009/0112457 A1* | 4/2009 | Sanchez | ............... | G01C 11/34 701/533 |
| 2010/0184406 A1* | 7/2010 | Schrader | ............ | H04M 1/6091 455/411 |

FOREIGN PATENT DOCUMENTS

| | | | |
|---|---|---|---|
| JP | 2007-004281 | A | 1/2007 |
| JP | 2008-097082 | A | 4/2008 |
| JP | 2011-237811 | A | 11/2011 |
| JP | 2012-042952 | A | 3/2012 |
| JP | 2014-512049 | A | 5/2014 |
| WO | 2012/098651 | A1 | 7/2012 |
| WO | 2012/138587 | A2 | 10/2012 |

OTHER PUBLICATIONS

Graham Neubig et al., "Pointwise Prediction for Robust, Adaptable Japanese Morphological Analysis," Proceedings of the 49th Annual Meeting of the Association for Computational Linguistics: Human Language Technologies: short papers, vol. 2, ser. HLT, 2011, pp. 529-533, retrieved: http://dl.acm.org/citation.cfm?id=2002736. 2002841.

Japanese Office Action Notice of Reasons for Rejection application No. 2012-252240 mailed Jul. 8, 2015.

* cited by examiner

Fig. 8

```
USER: "IT'S RAINING."
SYSTEM: "DO I RECORD WEATHER: RAIN?"
USER: "YES."
SYSTEM: "I RECORD WEATHER: RAIN."
```

Fig. 9

USER: "RECORD LOCATION EVERY 10 MINUTES FROM NOW."

SYSTEM: "DO I RECORD EVERY 10 MINUTES?"
USER: "THANK YOU."

Fig. 10

USER: "INPUT OF SENTENCE."

SYSTEM: "SHIFT TO SENTENCE INPUT MODE. IN THIS MODE, PLEASE READ OUT SENTENCE TO BE INPUT WHILE SEPARATING THE SAME INTO SHORT SENTENCES."

USER: "AROUND WAKO-SHI STATION,"

SYSTEM: "AROUND WAKO-SHI STATION,"

USER: "THERE ARE QUITE A FEW PEOPLE."

SYSTEM: "WEDDING CEREMONY."

USER: "CORRECT."

SYSTEM: "ONCE AGAIN, PLEASE."

USER: "THERE ARE MANY PEOPLE."

SYSTEM: "THERE ARE MANY PEOPLE."

USER: "SAVE."

SYSTEM: "I SAVE TEXT: "AROUND WAKO-SHI STATION, THERE ARE MANY PEOPLE." END OF SENTENCE INPUT MODE."

Fig. 11

```
USER: "INPUT OF SENTENCE."
SYSTEM: "SHIFT TO SENTENCE INPUT MODE."
USER: "I'M GOING TO WAKO-SHI STATION."
SYSTEM: "I'M GOING TO WAKO-SHI STATION."
USER: "PLEASE WAIT ANOTHER FEW MINUTES."
SYSTEM: "PLEASE WAIT ANOTHER FEW MINUTES."
USER: "SAVE."
SYSTEM: "I SAVE TEXT. END OF SENTENCE INPUT MODE."
USER: "PLEASE SEND THIS TO HANAKO."
SYSTEM: "DO I SEND PREVIOUSLY SAVED TEXT TO HANAKO
     YAMADA?"
USER: "YES."
SYSTEM: "I SENT IT."
USER: "FROM NOW ON, DESTINATION IS Twitter."
SYSTEM: "DESTINATION IS SET TO Twitter."
USER: "ROAD CONSTRUCTION."
SYSTEM: "DO I RECORD INFORMATION: ROAD CONSTRUCTION?"
USER: "YES."
SYSTEM: "I POST INFORMATION: ROAD CONSTRUCTION HERE TO
     Twitter."
USER: "CANCEL."
SYSTEM: "I DELETED PREVIOUS POSTING TO Twitter."
```

Fig. 12

```xml
<?xml version="1.0"encoding="UTF-8"?>
<grammar root="weather">
<rule id="weather"scope="public">
    <one-of>
    <item>
        <ruleref uri="#goodWeather"/>
        <tag> out.slot=rules.goodWeather;</tag>
    </item>
    <item>
        <ruleref uri="#rainWeather"/>
        <tag> out.slot=rules.rainWeather;</tag>
    </item>
    </one-of>
    <tag> out.type="weather";</tag>
</rule>

</rule id="goodWeather">
    <item> FINE </item>
    <tag> out="fine";</tag>
</rule>

<rule id="rainWeather">
    <item> RAIN </item>
    <tag> out="rain";</tag>
</rule>
<grammar>
```

Fig. 13

```
<?xml version="1.0"encoding="UTF-8"?>
<templates>

<generation type="confirm-record">

<madl>
        <utterance> DO I RECORD WEATHER [weather]? </utterance>
    </madl>
</generation>

<generation type="prompt-record">
    <madl>
        <utterance> I RECORD WEATHER [weather] AT THIS SPOT. </utterance>
        <publish title="WEATHER "
            latitude="{latitude}"longitude="{longitude}"
            timestamp="{timestamp}"text="{weather}"/>
    </madl>
</generation>

</templates>
```

… … …

MESSAGE PROCESSING DEVICE

BACKGROUND

Technical Field

The present invention relates to a message processing device, which produces a message and processes the message based on user speech input.

Related Art

A social networking service (hereinafter, referred to as SNS) such as Twitter and Facebook is widely used. The SNS is based on message text, so that one or more users produce the message text in order to participate in the SNS. In general, the message text may be produced by key input from personal computers, smart-phones and the like. Therefore, users in automobiles and walking users have difficulty in participating in the SNS. Therefore, devices that enable hands-free and eyes-free transmission of mails or posting to the SNS are desired.

A system that produces and sends mails based on user speech input has been developed (JP 2007-4281 A, for example).

SUMMARY OF THE INVENTION

Although the above-mentioned system may be used to transmit mails, operation such as the key input is required, hampering hands-free composition of the mails. Since the above-mentioned system is a system specifically designed for transmitting mails, a larger and more complicated system is required in order to apply the same for posting to the SNS.

Thus, no disclosure has been made for a message processing device having a simple configuration capable of easily composing the message text and sending the same by mail or posting the same to the SNS based on the user speech input alone.

Therefore, an object of the present invention is to provide a message processing device having a simple configuration capable of easily composing message text and sending the same by mail or posting the same to SNS solely based on user speech input.

A message processing device according to the present invention is provided with a speech input recognition unit, which processes input speech to produce a speech recognition result, and an event processing unit, which processes an event including the produced speech recognition result or one or more commands. The device is also provided with an expert unit including a plurality of expert modules, each of which has an individual function and processes the event in cooperation with the event processing unit, and an execution history management unit, which manages execution history of the expert modules. The expert unit is, as a speech processing expert module for recording user's speech as a message text, provided with a standard format speech processing expert module for producing a standard format text message and a speech processing expert module for producing a free format text message. The expert unit is also provided with a transmission expert module for sending the recorded message text.

The message processing device according to the present invention is provided with the standard format text composing speech processing expert module for composing the standard format text message and the free format text composing speech processing expert module for composing the free format text message as the speech processing expert modules for recording the user speech as the message text, and the transmission expert module for transmission the recorded message text, so that the message text may be produced and sent based on a user speech input alone. Especially, this may respond to both of a case in which standard format text is wanted to be sent quickly and a case in which free format text is wanted to be sent, so that a system having a high degree of usability may be implemented.

In the message processing device according to a first embodiment of the present invention, the expert unit is configured to be provided with a transmission control expert module for allowing the transmission expert module, which performs transmission in cooperation with the execution history management unit, to execute an undo process or a redo process.

According to this embodiment, the same transmission control expert module processes also when different expert modules are involved in text transmission such as a case in which the standard format text message is sent and a case in which the free format text is sent, so that the undo process or the redo process may conveniently be carried out without making the system complicated.

In a message processing device according to a second embodiment of the present invention, the expert unit is provided with a destination expert module, which determines a destination of a text message.

According to this embodiment, smooth response to change may be made when the destination is desired to change from mail to SNS when the message text is being produced, with the destination expert module made independent from the speech processing expert module for producing free format text.

A message processing device according a third embodiment of the present invention is the message processing device according to the second embodiment, wherein the speech processing expert module for producing standard format text produces messages containing locations at predetermined time intervals.

According to this embodiment, the message containing locations may be produced at a predetermined time interval, so that automatic transmission may be made of the message of the locations of the user who moves via transportation means such as an automobile and a train.

In a message processing device according to a fourth embodiment of the present invention, the speech processing expert module for producing free format text has functions to correct, redo correction, save, and cancel.

According to this embodiment, the user may efficiently produce the message solely from speech by utilizing the functions to correct, redo correction, save, and cancel.

In a message processing device according to a fifth embodiment of the present invention, the transmission of the message includes posting to a social networking service.

According to this embodiment, the user may perform hands-free and eyes-free mail transmission or posting to the SNS solely from speech also in a situation in which a key input is difficult such as when the user is moving or at work.

BRIEF DESCRIPTION OF DRAWINGS

FIG. 8 is a view illustrating a specific example of a dialogue for describing a weather expert module, which processes a standard format text about weather;

FIG. 9 is a view illustrating a specific example of a dialogue for describing a location repeated record expert module;

FIG. 10 is a view illustrating a specific example of a dialogue for describing an expert module for free format text;

FIG. 11 is a view illustrating a specific example of a dialogue for describing a transmission expert module and the redo/undo expert module;

FIG. 12 is a view illustrating an example of a format of an input description; and FIG. 13 is a view illustrating an example of an XML format for describing an output.

DETAILED DESCRIPTION

Figure 1:
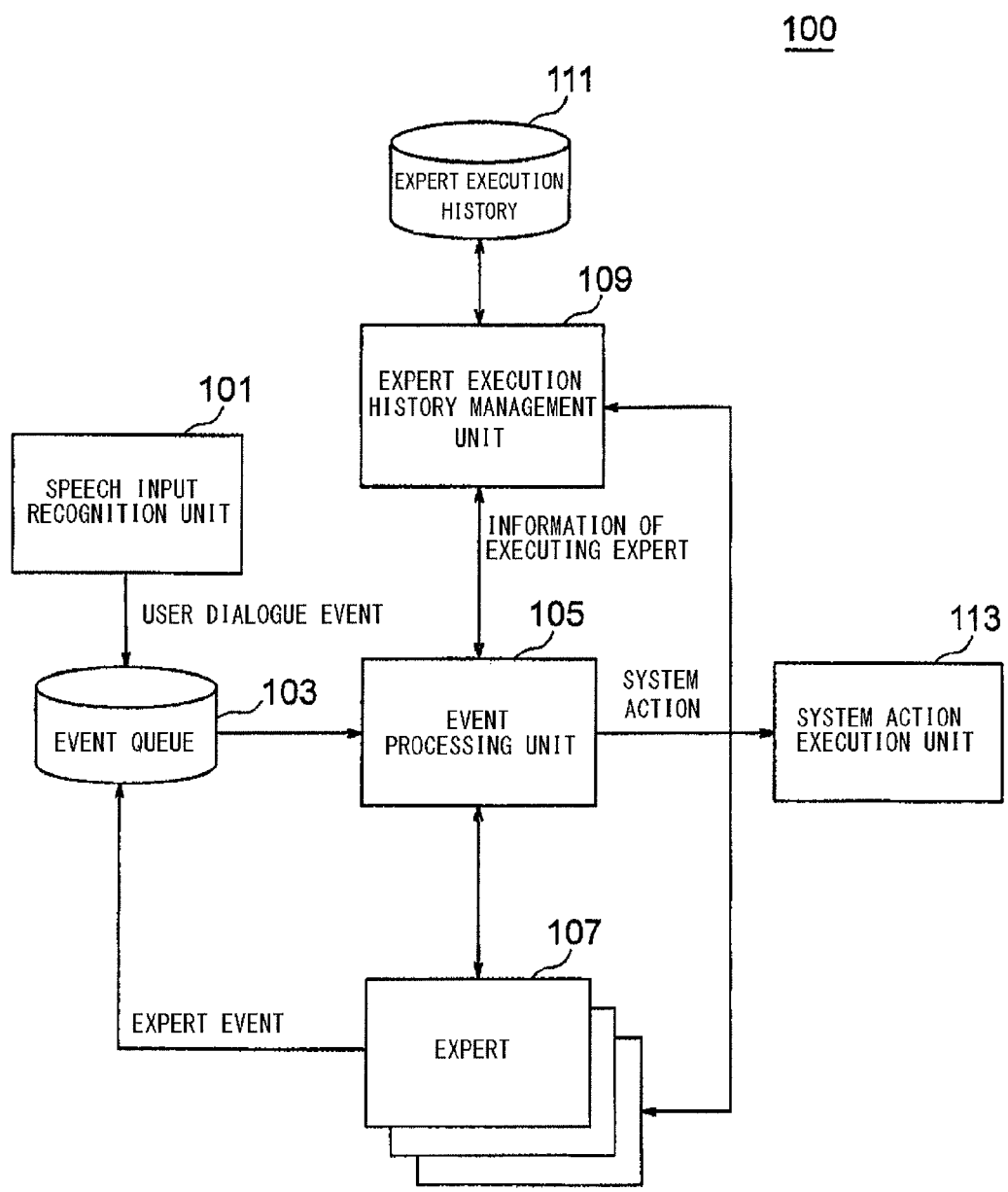
FIG. 1 is a view illustrating a configuration of a message processing device according to one embodiment of the present invention.

FIG. 1 is a view illustrating a configuration of a message processing device 100 according to one embodiment of the present invention. The message processing device 100 is provided with a speech input recognition unit 101, an event queue storage unit 103, an event processing unit 105, an expert unit 107, an expert execution history management unit 109, an expert execution history storage unit 111, and a system action execution unit 113. The speech input recognition unit 101 performs speech recognition and language understanding of an input user speech. The event queue storage unit 103 stores an event including a speech recognition result and a language understanding result of the user speech recognized by the speech input recognition unit 101 and an event created by the expert unit 107. Herein, the event refers to information for specifying/executing a task to a system (system action). The event processing unit 105 processes the event stored in the event queue storage unit 103. The expert unit 107 includes a plurality of expert modules each of which has an individual function and processes the event in cooperation with the event processing unit 105. Meanwhile, in FIG. 1 and subsequent drawings, the expert module is also referred to as the expert. The expert execution history management unit 109 manages execution history of the expert module. The expert execution history storage unit 111 stores the execution history of the expert module. The system action execution unit 113 executes the system action based on a processing result of the event. The system action includes display of information to the user, transmission of produced message text by mail, and posting of the same to SNS.

Figure 2:
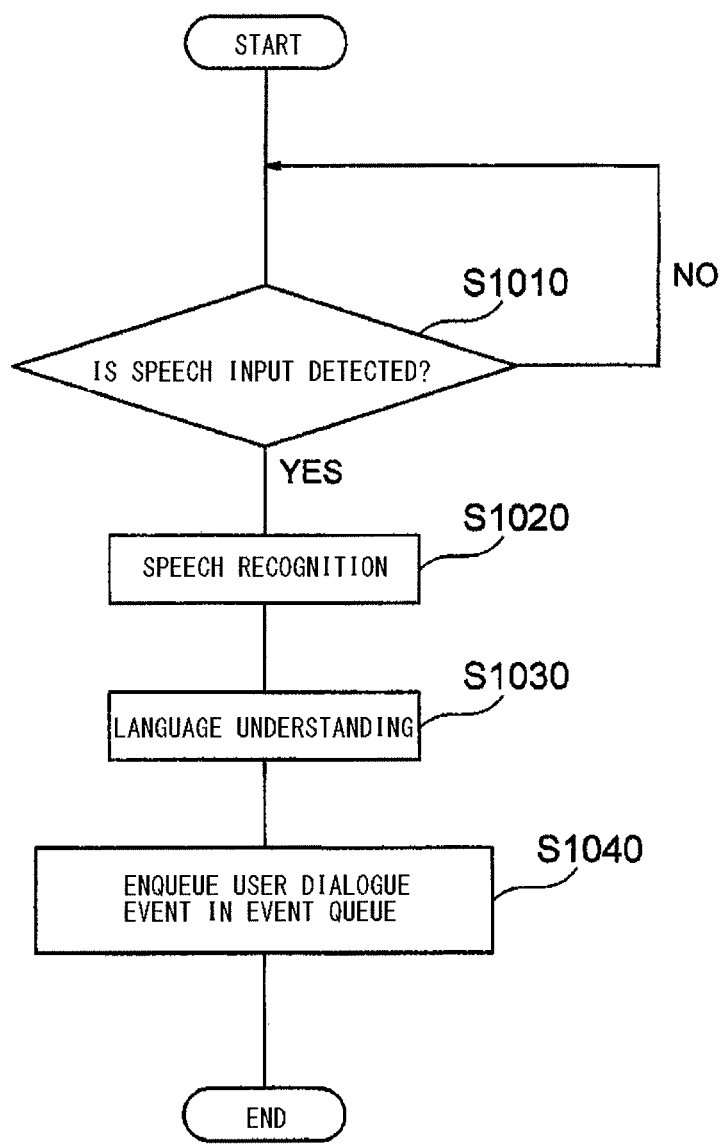
FIG. 2 is a flow diagram illustrating operation of a speech input recognition unit.

FIG. 2 is a flow diagram illustrating operation of the speech input recognition unit 101.

At step S1010 in FIG. 2, the speech input recognition unit 101 determines whether a speech input is detected. When the speech input is not detected, this stands by. When the speech input is detected, the procedure shifts to step S1020.

At step S1020 in FIG. 2, the speech input recognition unit 101 performs the speech recognition of the input speech (user speech).

At step S1030 in FIG. 2, the speech input recognition unit 101 performs the language understanding of the speech recognition result of the user speech.

At step S1040 in FIG. 2, the speech input recognition unit 101 enqueues a user dialogue event (UserDialogueActEvent) in an event queue. Herein, the user dialogue event is data (structure) including the speech recognition result and the language understanding result of the user speech.

Figure 3:
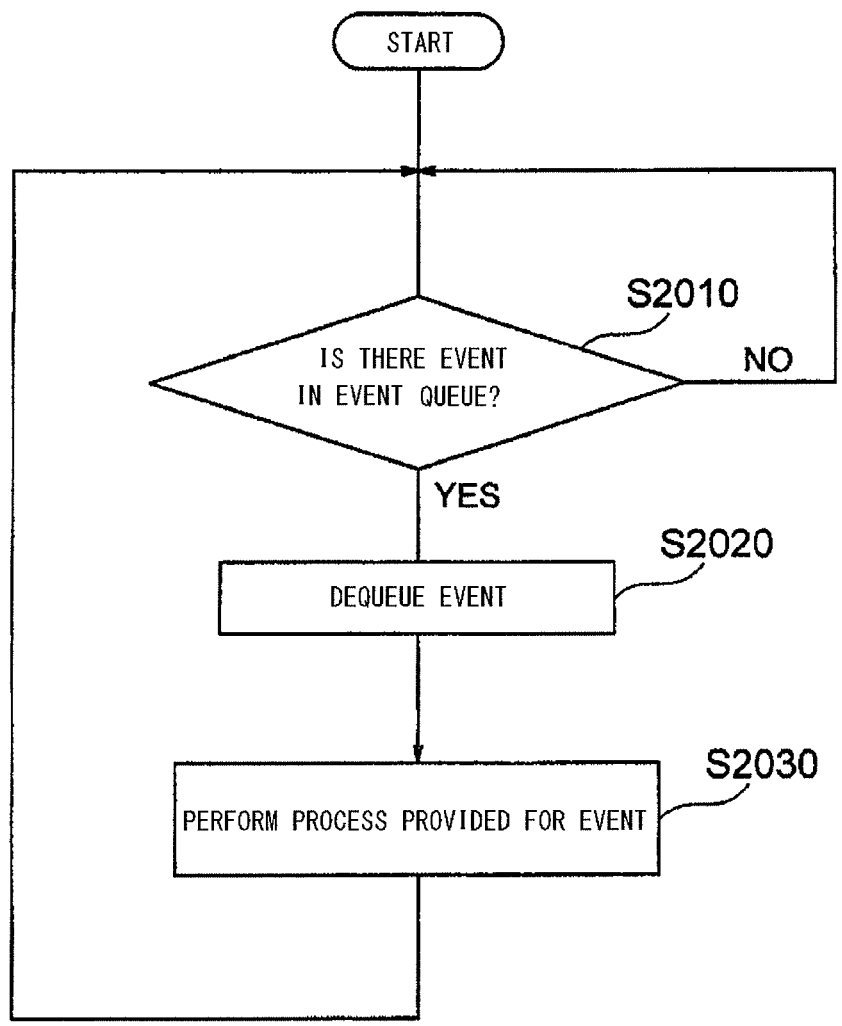
FIG. 3 is a flow diagram for illustrating operation of an event processing unit.

FIG. 3 is a flow diagram for illustrating operation of the event processing unit 105.

At step S2010 in FIG. 3, the event processing unit 105 determines whether there is the event in the event queue of the event queue storage unit 103. When there is no event, this stands by. When there is the event, the procedure shifts to step S2020 in FIG. 3.

At step S2020 in FIG. 3, the event processing unit 105 dequeues the event from the event queue of the event queue storage unit 103.

At step S2030 in FIG. 3, the event processing unit 105 performs a process corresponding to the dequeued event. At that time, the event processing unit 105 performs the process in cooperation with the expert module of the expert unit 107.

The expert module is prepared for each dialogue domain, so that the message processing device may process a multi-domain dialogue. For example, in a case of a portable information terminal, the expert module is prepared for each of a telephone function, a schedule management function, a map function and the like, and it is configured such that, when the user speech for telephone is input, the expert module associated with the telephone is activated to execute the process corresponding to the input speech. This multi-domain processing method using a plurality of expert modules substantially decreases complexity of management of an actual multi-domain dialogue. Therefore, a robust system may be produced. For example, when an speech for confirmation is executed by the system, the user speech for this is "Yes" or "No" in most cases. Processing of the speeches common to all the domains is accompanied with a condition in each domain of the dialogue. The message processing device may efficiently implement complicated conditional branching described above by using a plurality of expert modules.

Table 1 indicates names and functions of the expert modules used in the message processing device of this embodiment.

TABLE 1

| NAME | CLASS | FUNCTION |
| --- | --- | --- |
| TEXT EDIT | TEXT EDIT EXPERT | PROCESSING OF FREE FORMAT TEXT |
| WEATHER | USER RECORD EXPERT | PROCESSING OF STANDARD FORMAT TEXT ABOUT WEATHER |
| LOCATION | USER RECORD EXPERT | PROCESSING OF STANDARD FORMAT TEXT ABOUT LOCATION |
| ROAD CONSTRUCTION | USER RECORD EXPERT | PROCESSING OF STANDARD FORMAT TEXT ABOUT ROAD CONSTRUCTION |
| TRAFFIC | USER RECORD EXPERT | PROCESSING OF STANDARD FORMAT TEXT ABOUT TRAFFIC INFORMATION |
| REPEAT OF LOCATION | USER RECORD EXPERT WITH SLOT | REPEATED RECORD OF LOCATION |

TABLE 1-continued

| NAME | CLASS | FUNCTION |
| --- | --- | --- |
| SENDING | SENDING EXPERT | SENDING (POSTING) OF MESSAGE |
| REDO/UNDO | REDO/UNDO EXPERT | REDO/UNDO REGISTRATION |
| DESTINATION | DESTINATION SETTING EXPERT | SETTING OF MESSAGE DESTINATION |

Some expert modules are implemented with a common code (class). The expert modules may be individualized by describing an input and an output thereof at the time of execution. The expert module is described later in detail.

Figure 4:
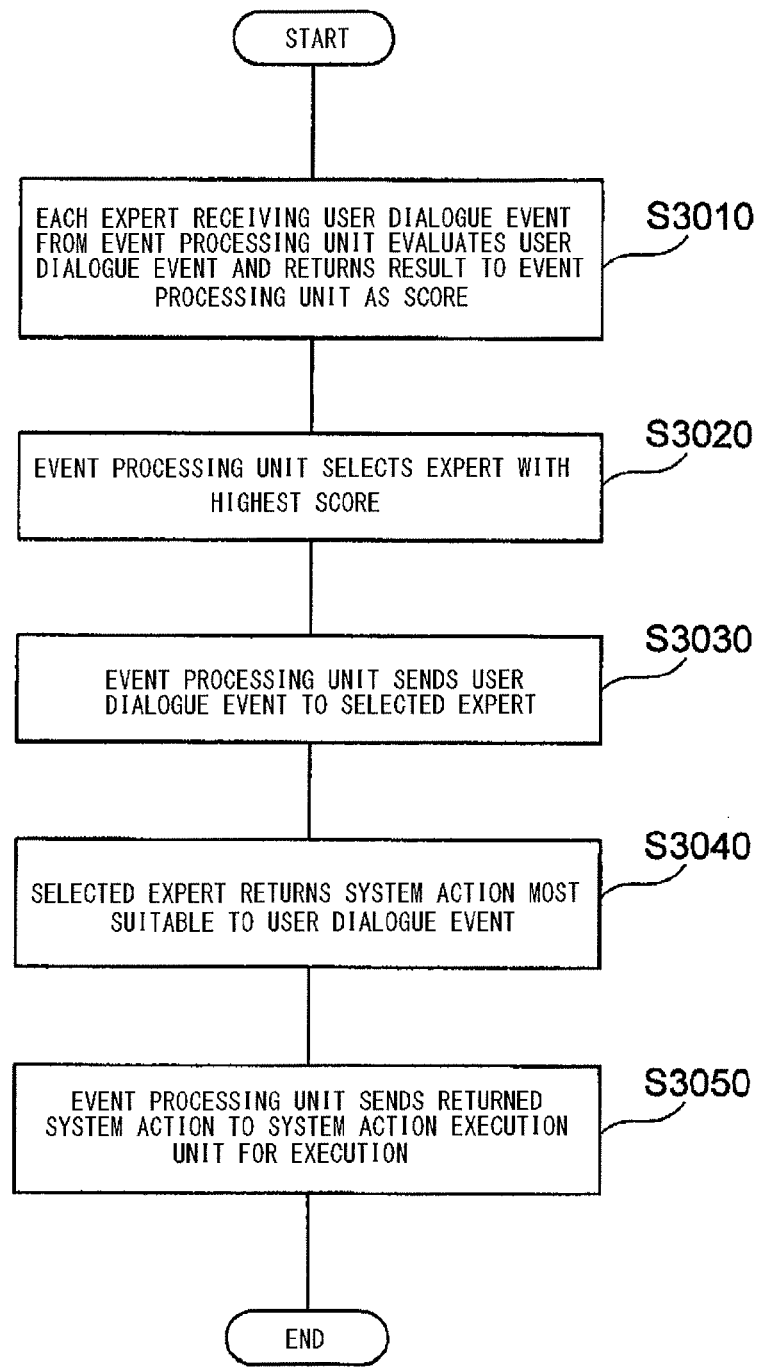
FIG. 4 is a flow diagram for illustrating operation of the event processing unit and an expert unit to process a user dialogue event.

FIG. 4 is a flow diagram for illustrating operation of the event processing unit 105 and the expert unit 107 to process the user dialogue event. The operation of the event processing unit 105 in this flow diagram corresponds to the operation of the event processing unit 105 in FIG. 3.

At S3010 in FIG. 4, the event processing unit 105 sends the user dialogue event dequeued from the event queue of the event queue storage unit 103 to the expert module associated with the user dialogue event. Each expert module evaluates the user dialogue event and returns a result to the event processing unit 105 as a score. Herein, the score is an indicator of a degree of association between the user dialogue event and the expert module.

At S3020 in FIG. 4, the event processing unit 105 selects the expert module, which sends the highest score.

At S3030 in FIG. 4, the event processing unit 105 sends the user dialogue event to the selected expert module and instructs the same to process the user dialogue event.

At S3040 in FIG. 4, the selected expert module returns the system action most suitable to the user dialogue event to the event processing unit 105.

At S3050 in FIG. 4, the event processing unit 105 sends the returned system action to the system action execution unit 113 for execution.

As described above, the expert module, which handles the process, is determined each time the user speech is detected. In order to reduce undesirable movement between the dialogue domains, the expert module, which handles a preceding speech, has priority on handling of a current user speech. Further, when the text edit expert module for a free format text input mode is selected, the text edit expert module does not give control to another expert module unless the user issues a spoken command such as "save" and "cancel". A command (instruction) of the text edit expert module for the free format text input mode is described later.

Figure 5:
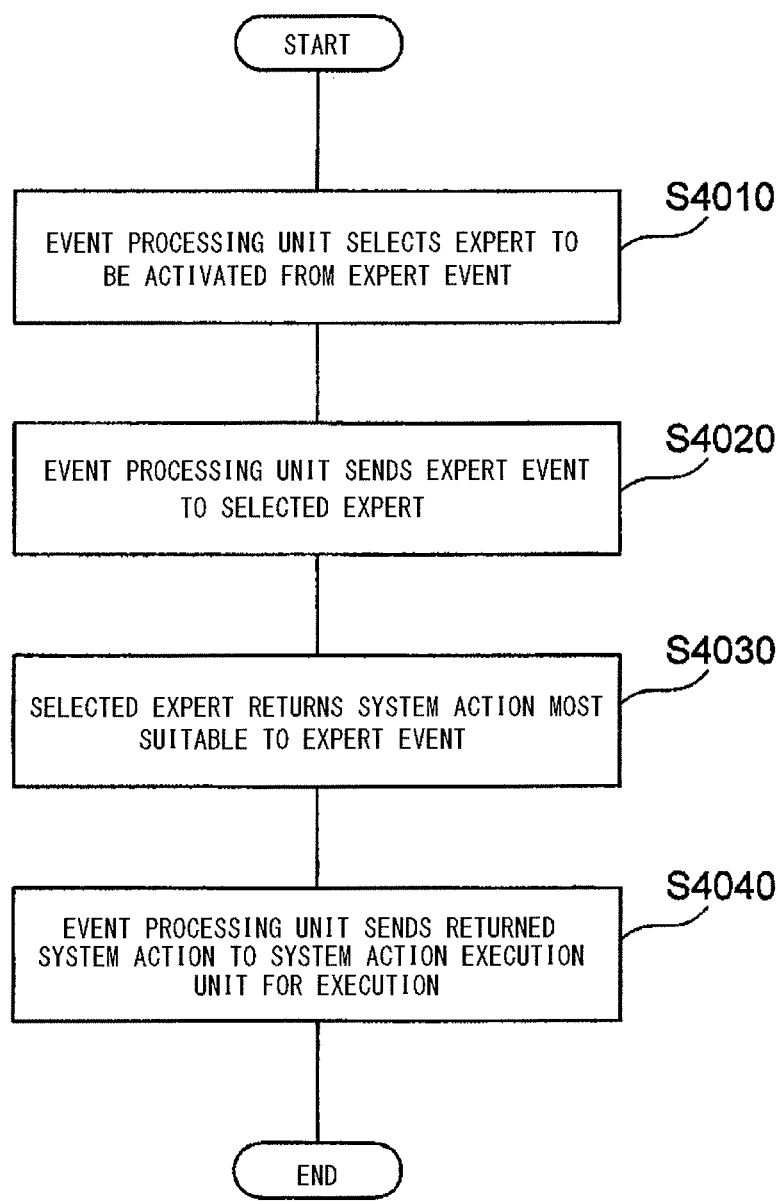
FIG. 5 is a flow diagram for illustrating the operation of the event processing unit and the expert unit to process an expert event.

FIG. 5 is a flow diagram for illustrating the operation of the event processing unit 105 and the expert unit 107 to process the expert event in general. The operation of the event processing unit 105 in this flow diagram corresponds to the operation of the event processing unit 105 in FIG. 3.

Herein, the expert event is data including a certain command from a certain expert module to another expert module. The expert event is registered in the event queue of the event queue storage unit 103 by the expert module.

At S4010 in FIG. 5, the event processing unit 105 selects the expert module to be activated (performing the process) from the expert event dequeued from the event queue of the event queue storage unit 103.

At S4020 in FIG. 5, the event processing unit 105 sends the expert event to the selected expert module.

At S4030 in FIG. 5, the selected expert module returns the system action most suitable to the expert event to the event processing unit 105.

At S4040 in FIG. 5, the event processing unit 105 sends the returned system action to the system action execution unit 113 for execution.

Figure 6:
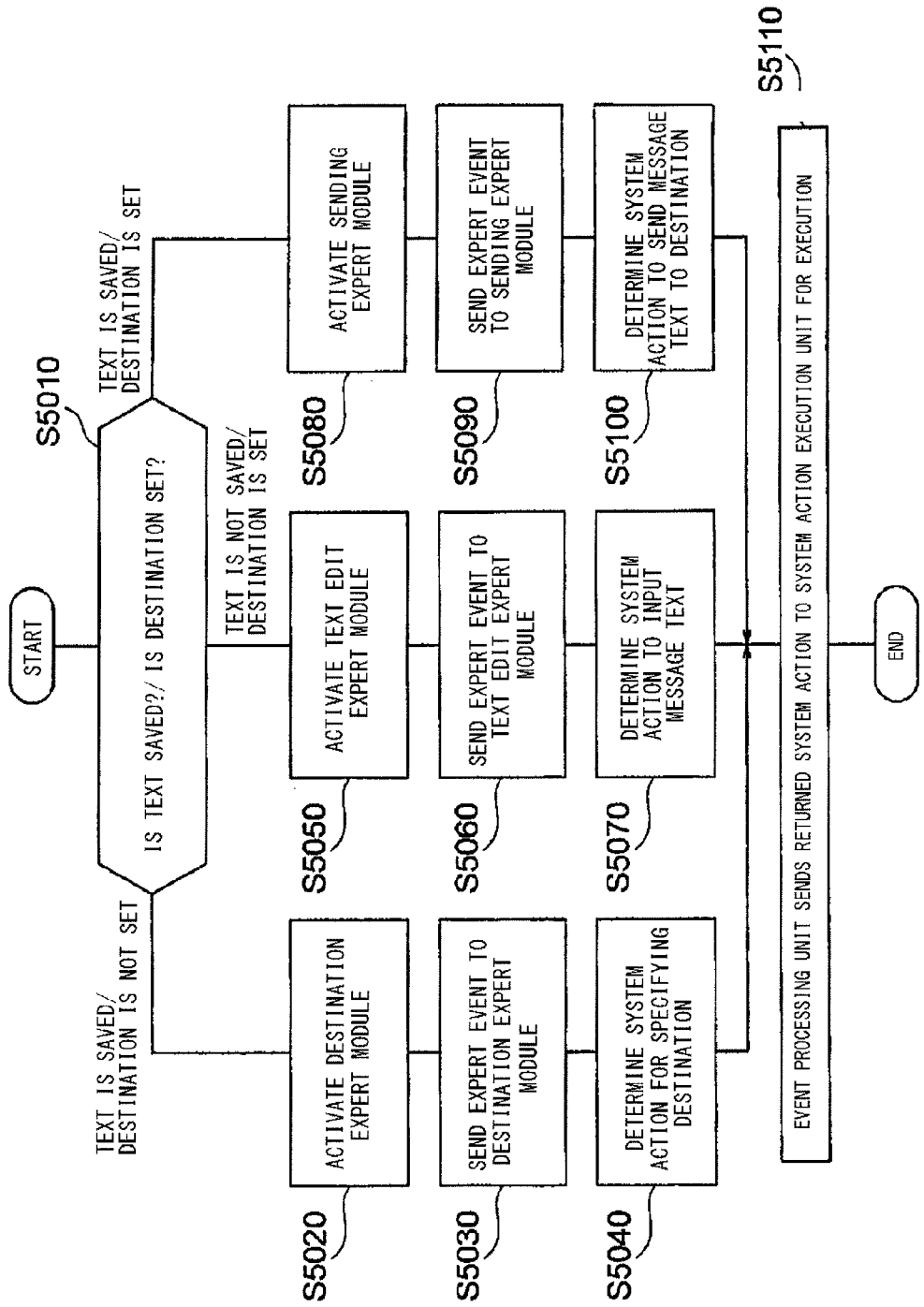
FIG. 6 is a flow diagram for especially illustrating the operation of the event processing unit and the expert unit to process a message transmission event.

FIG. 6 is a flow diagram for especially illustrating the operation of the event processing unit 105 and the expert unit 107 to process a message transmission event.

At S5010 in FIG. 6, the event processing unit 105 confirms whether the message text is saved or a destination of the message is set. When the message text is saved and the destination is not set, the destination expert module is activated at S5020. When the message text is not saved and the destination is set, the text edit expert module for the free format text is activated at S5050. When the message text is saved and the destination is set, the transmission expert module is activated at S5080 (corresponding to S4010 in FIG. 5).

At step S5030 in FIG. 6, the expert event to set the destination is sent to the activated destination expert module (corresponding to S4020 in FIG. 5).

At step S5040 in FIG. 6, the destination expert module determines the system action to specify the destination and returns the same to the event processing unit 105 (corresponding to S4030 in FIG. 5). The destination expert module is the expert module for setting the destination, that is to say, whether the message is sent by mail or posted to SNS. When the message is sent by mail, a delivery address is set. The system action determined by the destination expert module includes an inquiry sentence output (system speech) for making an inquiry to the user about whether to send by mail or post to the SNS, for example, or an inquiry sentence output for making an inquiry about whether it is possible to send to a previous destination read from the expert execution history unit.

When the text edit expert module for the free format text is activated at S5050 in FIG. 6, the expert event to input the message text is sent to the activated text edit expert module for the free format text at step S5060 in FIG. 6.

At step S5070 in FIG. 6, the text edit expert module for the free format text determines the system action to input the message text. This is the system speech for requesting the user to utter the message to be sent, for example.

When the transmission expert module is activated at step S5080 in FIG. 6, the expert event to send the message text is sent to the transmission expert module at step S5090 in FIG. 6.

At step S5100 in FIG. 6, the transmission expert module determines the system action to send the input message text to the set destination and returns the same to the event processing unit 105.

At step S5110 in FIG. 6, the event processing unit 105 sends the returned system action to the system action execution unit 113 for execution.

Figure 7:
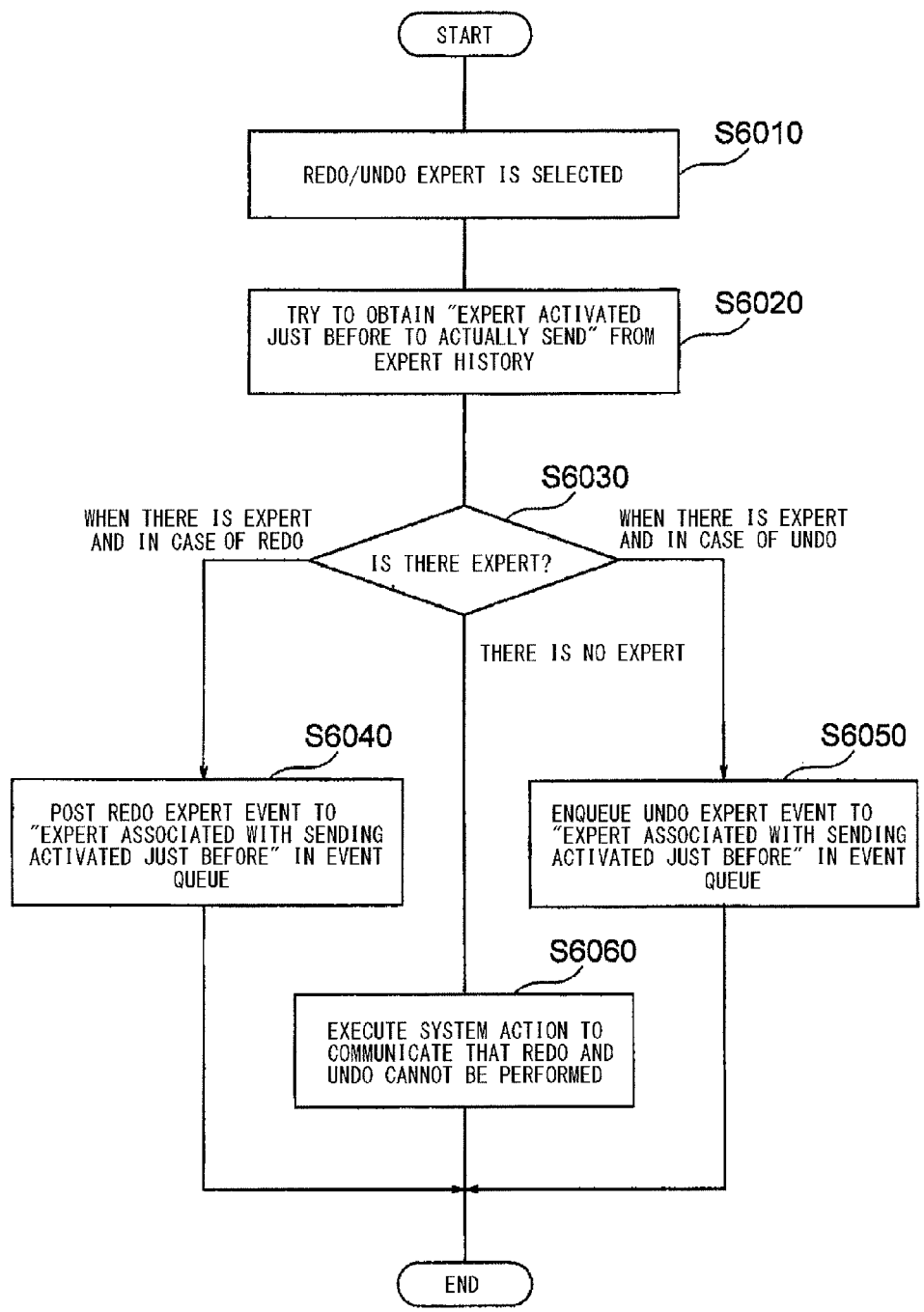
FIG. 7 is a flow diagram for illustrating operation of a redo/undo expert module.

FIG. 7 is a flow diagram for illustrating operation of the redo/undo expert module. The redo/undo expert module redoes/undoes the transmission and the posting already performed by the expert module.

At step S6010 in FIG. 7, the redo/undo expert module is selected by the event processing unit 105 to start a process.

At step S6020 in FIG. 7, the redo/undo expert module tries to obtain an "expert module activated just before to actually send" from the expert execution history management unit 109.

At step S6030 in FIG. 7, the redo/undo expert module determines whether there is a target expert module. When there is the target expert module and in a case of redo, the procedure shifts to step S6040. When there is the target expert module and in a case of undo, the procedure shifts to step S6050. When there is no target expert module, the procedure shifts to step S6060.

At step S6040 in FIG. 7, the redo/undo expert module enqueues a redo expert event to the "expert module activated just before to actually send" in the event queue of the event queue storage unit 103.

At step S6050 in FIG. 7, the redo/undo expert module enqueues an undo expert event to the "expert module activated just before to actually send" in the event queue of the event queue storage unit 103.

At step S6060 in FIG. 7, the redo/undo expert module communicates to the event processing unit 105 that it is not possible to redo and undo. The event processing unit 105 allows the system action execution unit 113 to execute a predetermined system action such as display.

Herein, each expert module is described using a specific example of a dialogue with the user.

The expert module for a standard format text generates a standard format text based on the dialogue between the user and the message processing device. The expert module for the standard format text may be set to have a function to send the standard format text to a predetermined destination. This way, in transmitting the determined standard format text, the message text may be sent without going through a process of terminating the expert module for the standard format text once and activating the destination expert module to determine the destination, which is followed by activation of the transmission expert module to send the message text. Thus, quick transmission may be achieved improving usability.

FIG. 8 is a view illustrating a specific example of a dialogue for describing the weather expert module, which processes the standard format text about weather. For example, it is possible to post weather information at the point by speaking to a smartphone. The standard format text generated as a result of the dialogue illustrated in FIG. 8 is "Weather: rain, 2:30 pm, May 6, 2012". Posted data including the above-described text and the like includes information based on a location at which the dialogue is generated.

As another example, the user may post about road construction and traffic situation. Further, the user may set to post his/her actual location every 10 minutes by the dialogue.

FIG. 9 is a view illustrating a specific example of a dialogue for describing the location repeated record expert module. As a result of the dialogue illustrated in FIG. 9, the standard format text "I'm here." is generated together with the location-based information every 10 minutes.

Therefore, the user may post to a microblog such as Twitter by generating the standard format text with intended timing without the need to operate while watching a screen.

Meanwhile, in this example, the expert module for the standard format text is set for each domain such as weather and location. That is to say, the text edit expert module alone processes the free format text and a plurality of expert modules for the standard format text is prepared for the domains; however, a single expert module may be prepared for the standard format text for all the domains.

Next, the text edit expert module for the free format text is described. The user may request to input not only the standard format text but also the free format text. For this purpose, a mode in which the free format text may be input using the speech command is prepared. In order to use this mode, it is necessary to clearly instruct by a phase such as "I want to input text (sentence).", "Input of text (sentence)." and the like. Thereafter, an application shifts to a speech-based free format text input mode.

FIG. 10 is a view illustrating a specific example of a dialogue for describing the text edit expert module for the free format text.

In the free format text input mode, the text is separated into short sentences to be gradually input rather than being input at once. The application returns a recognition result for confirmation to each sentence. When a speech recognition error occurs, the user may input the sentence again by saying "correct" for a part input just before. In this mode, the user may edit the input text by the speech command indicated in following Table 2.

Table 2 indicates the speech commands used for generating the free format text.

TABLE 2

| SPEECH COMMAND | FUNCTION |
| --- | --- |
| "CORRECT"/"UNDO" | CORRECT PREVIOUSLY INPUT SENTENCE |
| "REDO" | CANCEL PREVIOUS CORRECTION |
| "SAVE" | SAVE ALL SENTENCES AND EXIT FROM TEXT INPUT MODE |
| "CANCEL" | CANCEL ALL AND EXIT FROM TEXT INPUT MODE |

When the user utters "save" at last, the input text is saved and the text may be sent to the microblog or to e-mail. Alternatively, when the user says "cancel" after the confirmation from the application, the application cancels the input text and exits from the free format text input mode. In the free format text input mode also, it is not necessary to watch the screen or operate a touch panel.

As described above, the user may input the text by two types of methods: the standard format text input and the free format text input.

FIG. 11 is a view illustrating a specific example of a dialogue for describing the transmission expert module and the redo/undo expert module. By these modules, the user may post to Twitter or send e-mail through Gmail only by the dialogue.

Input and output descriptions of the above-described expert modules implemented with the common code (class) are described.

Description of the input is in accordance with XML grammar format: W3C standard SRGS/SISR (Speech Recognition Grammar Specification Version 1.0. This application uses an automatic speech recognition system provided by Google, a so-called large vocabulary speech recognition system, which does not require grammatical description. The grammatical description is used for comprehension of the language. Comprehension of language is a process to convert the speech recognition result to semantics expression. The application uses a language analysis tool referred to as Kytea described in (G. Neubig, Y. Nakata, S. Mori, "Pointwise prediction for robust, adaptable Japanese morphologicalanalysis", in Proceedings of the 49th Annual Meeting of the Association for Computational Linguistics: Human Language Technologies: short papers—Volume 2, ser. HLT '11. Stroudsburg, Pa., USA: Association for Computational Linguistics, 2011, pp. 529-533. Kytea separates a Japanese sentence into words having certain semantic expression by generating a learning model in advance. A tool for generating the learning model of Kytea has also been developed. The tool automatically generates a training file from the grammatical description in an SRGS/SISR format. When analysis is executed, Kytea works at a very high speed on an Android terminal too.

FIG. 12 is a view illustrating an example of the above-described format of the input description.

FIG. 13 is a view illustrating an example of the XML format for describing the output. Herein, <generation type="confirm-record"> means a template of the output executed by specifying "confirm-record" as an argument "id" in a program. An actually executed content is described in a <madl> element. When it is described <speech>hello</speech> in this element, a speech synthesizer of the device utters "hello". Further, a description such as {longitude} is a variable and when it is specified as longitude="123.345"

in the program at the time of execution, the variable is substituted by a given value.

By describing such flexible input and output formats, the same class may become a number of types of expert modules. By adding the input and output description, the system may be easily extended. It is possible to easily add a new expert module for generating the standard format text other than those indicated in Table 1.

What is claimed is:

1. A message processing device, comprising:
   a speech input recognition unit that processes input speech to produce a speech recognition result;
   an event processing unit that processes an event containing the produced speech recognition result or a command;
   an expert unit including a plurality of expert modules, each of which has an individual function and processes the event in cooperation with the event processing unit; and
   an execution history management unit that manages execution history of the expert modules,
   wherein the expert unit is, as speech processing expert modules for recording a user speech as message text, provided with a speech processing expert module for producing a standard format text message and a speech processing expert module for producing a free format text message, and a transmission expert module for sending the recorded message text,
   wherein the expert unit is provided with a transmission control expert module for controlling the transmission expert module that performs transmission in cooperation with the execution history management unit to execute an undo process or a redo process, and
   wherein, among a plurality of transmission expert modules that have performed transmission in cooperation with the execution history management unit, the transmission control expert module controls a transmission expert module, which has just been activated and which has performed transmission, to execute an undo process or a redo process,
   wherein the standard format text message is produced into a predetermined form including at least one of a current time, a current location, and a situation in the current location based on a dialogue with the speech processing expert module,
   wherein the free format text message is produced by gradually inputting short sentences based on a dialogue with the speech processing expert module,
   wherein the expert unit is provided with a destination expert module, which determines a destination of a text message,
   wherein the speech processing expert module for producing the free format text has functions to correct, redo correction, save, and cancel,
   wherein the speech processing expert module for producing the standard format text is capable of transmitting the standard format text message to a predetermined destination without the plurality of transmission expert modules and the destination expert module at predetermined time intervals, and
   wherein the speech processing expert module for producing free format text is capable of transmitting the free format text message to the predetermined destination without the plurality of transmission expert modules and the destination expert module by a speech command to save uttered by the user.

2. The message processing device according to claim 1, wherein, among the plurality of transmission expert modules that have performed transmission in cooperation with the execution history management unit,
   if there is a transmission expert module which has just been activated and which has performed transmission, the transmission control expert module controls the transmission expert module, which has just been activated and which has performed transmission, to execute an undo process or a redo process, and
   if there is no transmission expert module which has just been activated and which has performed transmission, the transmission control expert module does not control execution of any undo process or redo process.

3. The message processing device according to claim 1, wherein the speech processing expert module for producing standard format text includes a module that produces a message containing location at a predetermined time interval.

4. The message processing device according to claim 1, wherein transmission of the message includes posting to a social networking service.

5. A method for processing message, comprising the steps performed by a processor of:
   processing input speech to produce a speech recognition result;
   processing an event containing the produced speech recognition result or a command;
   processing the event in cooperation with an expert unit; and
   managing execution history of the expert unit, wherein the expert unit, performs the steps of:
   producing, for recording user speech as message text, a standard format text message and a free format text message,
   sending the recorded message text, and
   executing an undo process or a redo process, wherein the expert unit includes a transmission expert module, and the transmission expert module, which has just been activated and which has performed transmission, executes the undo process or the redo process,
   wherein the standard format text message is produced into a predetermined form including at least one of a current time, a current location, and a situation in the current location based on a dialogue with the processor,
   wherein the free format text message is produced by gradually inputting short sentences based on a dialogue with the processor, wherein the expert unit is provided with a destination expert module, which determines a destination of a text message, wherein a speech processing expert module for producing free format text has functions to correct, redo correction, save, and cancel, wherein a speech processing expert module for producing standard format text is capable of transmitting the standard format text message to a predetermined destination without a plurality of transmission expert modules and the destination expert module at predetermined time intervals, and wherein the speech processing expert module for producing free format text is capable of transmitting the free format text message to the predetermined destination without the plurality of transmission expert modules and the destination expert module by a speech command to save uttered by the user.

6. The method according to claim 5, wherein if there is a transmission expert module which has just been activated and which has performed transmission, a transmission control expert module controls the transmission expert module, which has just been activated and which has performed transmission, to execute the undo process or the redo process, and if there is no transmission expert module which has just been activated and which has performed transmission, the transmission control expert module does not control execution of any undo process or redo process.

7. The method according to claim 5, wherein the expert unit produces a message containing location at a predetermined time interval.

8. A message processing device, comprising:

a speech input recognition unit that processes input speech to produce a speech recognition result;

an event processing unit that processes an event containing the produced speech recognition result or a command;

an expert unit including a plurality of expert modules, each of which has an individual function and processes the event in cooperation with the event processing unit; and an execution history management unit that manages execution history of the expert modules, wherein the expert unit is, as speech processing expert modules for recording a user speech as message text, provided with a speech processing expert module for producing a standard format text message and a speech processing expert module for producing a free format text message, and a transmission expert module for sending the recorded message text, and wherein the expert module, which handles a preceding speech, has priority on handling of a current user speech, wherein the standard format text message is produced into a predetermined form including at least one of a current time, a current location, and a situation in the current location based on a dialogue with the speech processing expert module, wherein the free format text message is produced by gradually inputting short sentences based on a dialogue with the speech processing expert module, wherein the expert unit is provided with a destination expert module, which determines a destination of a text message, wherein a speech processing expert module for producing the free format text has functions to correct, redo correction, save, and cancel, wherein a speech processing expert module for producing the standard format text is capable of transmitting the standard format text message to a predetermined destination without a plurality of transmission expert modules and the destination expert module at predetermined time intervals, and wherein the speech processing expert module for producing free format text is capable of transmitting the free format text message to the predetermined destination without the plurality of transmission expert modules and the destination expert module by a speech command to save uttered by the user.

9. The message processing device according to claim 8, wherein, when the speech processing expert module for producing a free format text message is selected, a control by the speech processing expert module for producing a free format text message is continued unless the user issues a specific spoken command.

10. The message processing device according to claim 8, wherein the speech processing expert module for producing standard format text includes a module that produces a message containing location at a predetermined time interval.

11. The message processing device according to claim 8, wherein transmission of the message includes posting to a social networking service.

* * * * *